United States Patent [19]

Ruch et al.

[11] Patent Number: 4,568,035
[45] Date of Patent: Feb. 4, 1986

[54] OILFIELD CABLE SERVICE TRAILER

[76] Inventors: James P. Ruch, 6112 S. Knoxville Ave.; Robert J. Spillar, 6660 S. Jamestown Pl., both of Tulsa, Okla. 74136

[21] Appl. No.: 570,400

[22] Filed: Jan. 13, 1984

[51] Int. Cl.$^4$ .................. B65H 19/20; B65H 75/40
[52] U.S. Cl. ................ 242/86.5 R; 254/280; 414/501; 414/538; 414/911
[58] Field of Search ............. 242/86.5; 254/279, 280, 254/281, 282; 414/538, 911, 501

[56] References Cited

U.S. PATENT DOCUMENTS

| | | | |
|---|---|---|---|
| 1,864,676 | 6/1932 | Smith et al. | 242/86.5 R X |
| 1,914,098 | 6/1933 | Bean | 414/538 |
| 2,501,390 | 3/1950 | Jeffreys | 242/86.5 R |
| 2,958,478 | 11/1960 | Peterson et al. | 242/86.5 R |
| 3,168,959 | 2/1965 | Chandler et al. | 414/538 X |
| 3,325,118 | 6/1967 | Hall | 242/86.5 R |
| 4,046,331 | 9/1977 | Decker | 242/86.5 R X |
| 4,155,518 | 5/1979 | Small | 242/86.5 R |
| 4,204,663 | 5/1980 | Baughn et al. | 242/58.6 X |
| 4,228,967 | 10/1980 | Woodruff | 242/86.5 R |

Primary Examiner—Donald Watkins
Assistant Examiner—Lynn M. Sohacki
Attorney, Agent, or Firm—Head, Johnson & Stevenson

[57] ABSTRACT

An apparatus for loading and unloading a cable spooling reel or drum onto a support frame structure for facilitating the use of the cable in a well bore drilling, servicing, or producing operation, or the like, the apparatus including a pivotal ramp for guiding the drum onto and off of the frame structure, a pair of winches engagable with the opposite end of the spool or reel shaft for moving the drum over the ramp and onto the frame structure and for unloading the drum from the frame structure, and a traverse mechanism for facilitating the winding and unwinding of the cable with respect to the core of the cable spooling drum.

11 Claims, 6 Drawing Figures

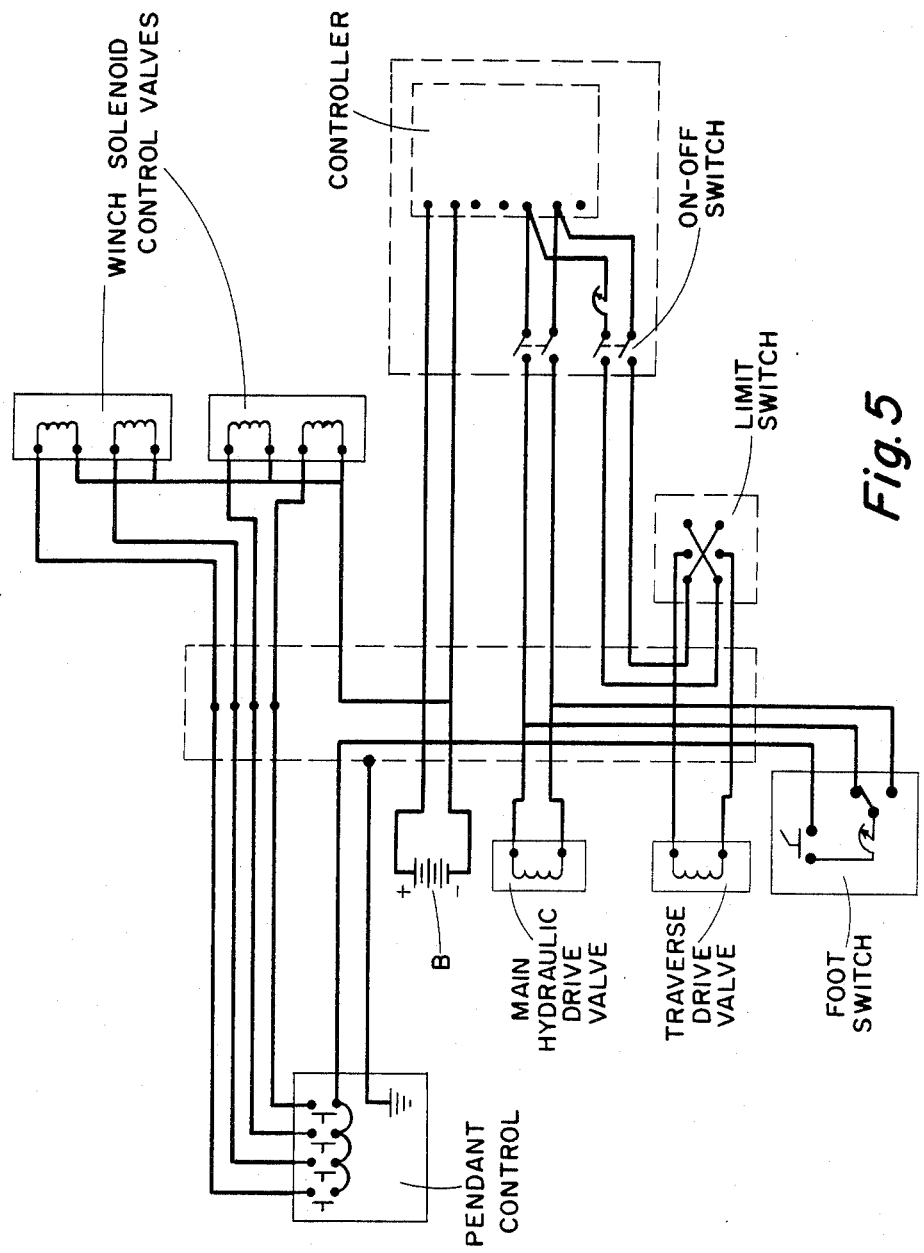

OILFIELD CABLE SERVICE TRAILER

BACKGROUND OF THE INVENTION

1. Field of the Invention

This invention relates to improvements in oil and/or gas well production equipment, and more particularly, but not by way of limitation, to servicing equipment for facilitating the manipulation of electrical cables, and the like, at an oil or gas well drilling or well bore production site.

2. Description of the Prior Art

The usual oil and/or gas well bore of today normally extends into the earth through a great distance, and the production of well fluid is usually accomplished by the use of down hole pumps, and the like, which elevate the well fluids to the surface of the ground for recovery. Electrical cables are widely used for supplying the power for the down hole equipment, and since the depth of the well is frequently great, it will be apparent that the length of the electrical cables is also sufficiently great as to be difficult to handle. During the installation of the down hole pump, or any other down hole equipment utilizing electrical power, the cables are usually fed downwardly through the well bore by strapping or tying of the cable to the well tubing. When the pump or other equipment is withdrawn from the well bore for any reason, such as for servicing, or the like, it is common practice to pull the well tubing and pump from the bore hole by apparatus known as a workover rig. The cable, of course, is normally withdrawn or pulled simultaneously with the well tubing and pump and is cut free and rolled onto a cable reel. Commonly, the cable reels are turned manually, and the operation requires the use of several men. This is not only a difficult maneuver, but also is dangerous in that, if the workover rig accidentally drops the tubing string during the pulling operation the cable is drawn quickly down the well bore simultaneously with the tubing, causing the cable reel to rapidly turn in a "reeling out" direction. This is extremely hazardous to the personnel handling the cable "reeling in" operation as well as anyone present at the site of the well head.

In some instances, trailers or trucks carrying the cable reels may be utilized at the well head, some of the reels being powered and others un-powered. This equipment has certain disadvantages in that they normally require more than one man for the operation thereof, and the same disadvantage of any dropping of the well tubing exists as hereinbefore set forth.

There have been attempts to solve these problems, as set forth in the Petersen et al U.S. Pat. No. 2,958,478, issued Nov. 1, 1960, and entitled "Reel Carrier with Loading and Unloading Mechanism Therefor;" Hall U.S. Pat. No. 3,325,118, issued June 13, 1967, and entitled "Cable Reel Drive Mechanism;" Decker, Sr. U.S. Pat. No. 4,046,331, issued Sept. 6, 1977, and entitled "Wire Roller;" Small U.S. Pat. No. 4,155,518, issued Jan. 26, 1978, and entitled "Reel Lifting Apparatus;" Gaughn et al U.S. Pat. No. 4,204,663, issued May 27, 1980, and entitled "Apparatus for Lifting a Reel;" Woodruff U.S. Pat. No. 4,228,967, issued Oct. 21, 1980, and entitled "Cable Reel Handling Apparatus for a Vehicle." Some of these devices have many disadvantages and weaknesses in that the reels are loaded and unloaded by an overhead hoist or crane and cannot be changed in the field. Other models are "self-loading" which requires that the reels must be loaded on concrete, or the like, as the lifting arms must fit closely around the reel. This is extremely difficult to accomplish in the field. Still others do not have a trasverse mechanism for powered layer winding of the cable onto the reel. In fact, one presently available unit in the field or industry does include a traverse that does not work satisfactorily and still requires a man to manually guide the cable onto the reel. This is a very dangerous operation. As hereinbefore set forth, the presently available equipment still normally requires at least one man working in a hazardous situation.

SUMMARY OF THE INVENTION

The present invention contemplates a novel oilfield cable service apparatus particularly designed and constructed for overcoming the foregoing disadvantages. The novel apparatus comprises a carriage or support frame structure, which may be a self-powered wheeled vehicle, a towed trailer, a skid unit, or the like, having a pair of hydraulically powered winches mounted thereon in combination with a cable reel support apparatus whereby the cable reel may be moved onto the support frame or carriage by actuation of the winch assemblies. The frame structure also includes a pivotal ramp which may be supported in an elevated position during transporting of the apparatus, and may be lowered into a position in the proximity of a cable reel during a loading and/or unloading operation. Assuming that the support frame structure is in the form of a trailer adapted to be towed behind a suitable tow vehicle, such as a one-ton dual wheel truck, by means of a typical goose-neck ball hitch, the trailer may be backed or otherwise manuevered into a field position whereby the rear of the support frame structure is in the proximity of a cable reel. The pivotal ramp means may then be lowered to an angular orientation extending between the "bed" of the support frame and the ground level, and a shaft member may be manually inserted into the reel anchor holes normally present on the cable reel. An independent winch cable is then secured to each end of the protruding shaft, and the operator of the apparatus may move to a remotely disposed control panel in order to initiate the operation of the winches from a safe position. It is preferable, of course, that the operator be in a location for visual supervision of the winch operation. Each of the winches are independently controlled and the cable of one winch is connected with one end of the reel shaft and the cable of the other winch is connected with the opposite end of the reel shaft. Upon the actuation of the winches the cable reel may be aligned with the longitudinal axis of the ramp in such a manner that the end flanges of the cable reel may be positioned in substantial alignment with complementary grooves provided on the ramp. As the winch lines or cables are wound onto the respective winches, the cable reel may be easily moved upwardly along the ramp and into a position on the support frame structure, whereupon reel lift arm means may be moved into engagement with the opposite ends of the cable reel shaft for securely and efficiently supporting the cable reel on the support frame structure. The cable reel is then in a "ready" condition for the reeling or unreeling of the cable therefrom. It is preferable that the ramp be maintained in the lowered position during operation of the cable reel to function as a stabilizer. Of course, the ramp may be returned to the elevated position thereof during the operation of the cable reel, if desired. The novel cable

BRIEF DESCRIPTION OF THE DRAWINGS

FIG. 3 is a plan view of a portion of a ramp structure utilized in cable service apparatus embodying the invention.

FIG. 5 is a schematic view of an electrical system utilized in a cable service apparatus embodying the invention.

DETAILED DESCRIPTION OF THE PREFERRED EMBODIMENT

Figure 1:
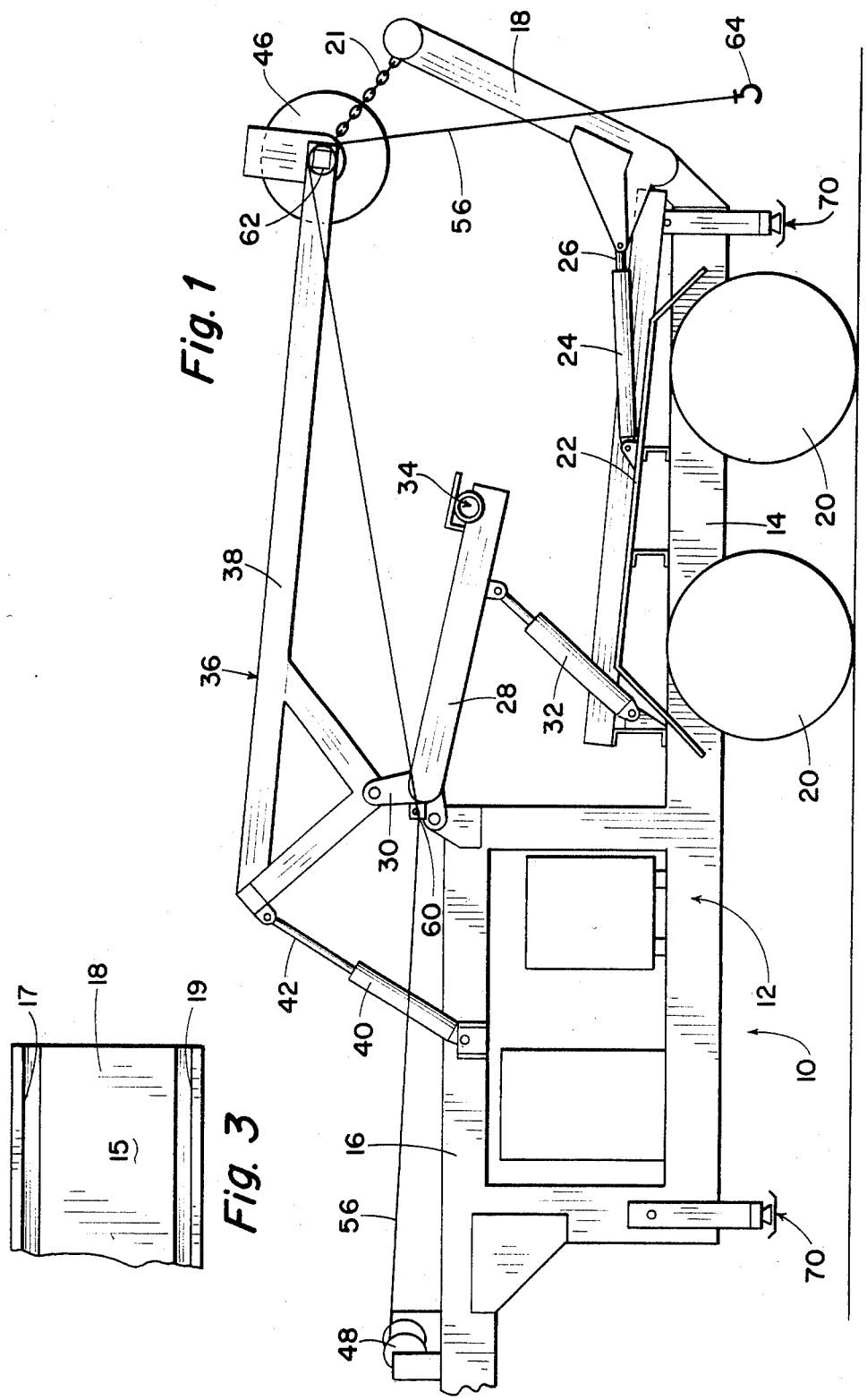
FIG. 1 is a side elevational view of a cable service apparatus embodying the invention, and illustrated in a transporting or unloaded mode.

Referring to the drawings in detail, reference character 10 generally indicates a cable service apparatus comprising a support frame structure or carriage 12 which may be of any suitable construction. The support frame structure 12 as shown herein is of a trailer-type construction adapted to be towed behind a suitable towing vehicle (not shown), such as a one-ton dual wheel truck. It is to be understood, however, that the support frame structure may be a self-powered vehicle, a skid unit, or the like, and there is no intention of limiting the invention to the trailer-type structure illustrated herein. The support frame structure includes a bed section 14 having a suitable goose-neck connector section 16 provided at one end thereof and a ramp section 18 pivotally secured at the opposite end thereof. The goose-neck connector section 16 may be provided with any suitable hitch means (not shown) for engagement with a ball hitch means, or the like (not shown) provided on the towing vehicle (not shown) for securing the trailer 12 to the towing vehicle as is well known.

The trailer 12 as shown herein is also provided with suitable wheel assemblies 20 disposed on the opposite sides thereof and in substantial axial alignment. Only one pair of the wheel assemblies 20 is shown in the drawings, and the wheels are preferably dual tandem axle type wheel assemblies, but not limited thereto. Substantially identical fender means 22 is preferably secured to the opposite sides of the bed section 14 for covering the wheel assemblies 20, as is well known. A fluid cylinder means 24 may be operably secured between each of the fender means 22 and the ramp section 18 whereby actuation of the cylinder means 24 for extending the reciprocal rod 26 thereof will pivot the ramp 18 in a clockwise direction as viewed in FIGS. 1 and 2, and actuation thereof for retracting the reciprocal rod 26 will move or pivot the ramp section 18 in a counterclockwise direction for a purpose as will be hereinafter set forth.

A pair of substantially identical reel lift arms 28 are pivotally secured to the support frame structure 12 in any suitable manner and in transversely spaced substantially mutually parallel relationship. Only one of the reel lift arms 28 is shown in the FIGS. 1 and 2, and as shown herein each arm 28 preferably has one end thereof pivotally secured to a toggle link means 30 at the juncture between the bed section 14 and the goose-neck connection section 16. A suitable fluid cylinder means 32 is operably secured between each of the reel lift arms 28 and the bed section 14 for providing a coordinated pivotal action of the arms 28 about the respective pivot connections 30. The reel lift arm means 28 is provided with cable reel engaging means generally indicated at 34 in the proximity of the outer ends thereof for a purpose as will be hereinafter set forth.

Figure 2:
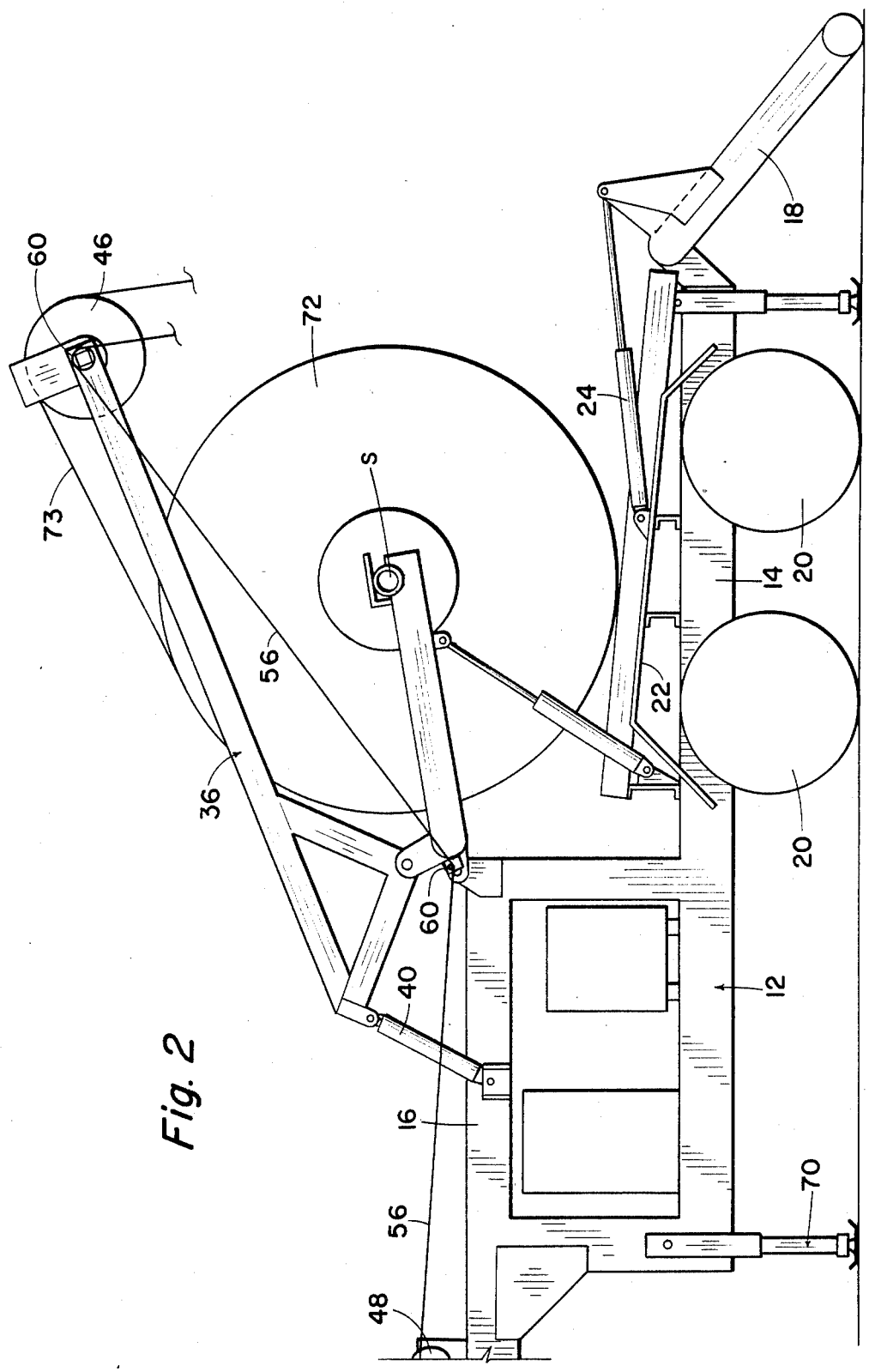
FIG. 2 is a side elevational view of a cable service apparatus embodying the invention, and illustrated with a cable reel mounted thereon.

A transverse lifting frame structure or means 36 is also pivotally secured to the support frame structure 12 in any suitable manner, and as shown herein is preferably pivotally secured to the toggle link means 30 in spaced relation with respect to the reel lift arms 28. The frame means 36 may be of any suitable type construction, and preferably is of an open frame-type configuration having a pair of substantially identical elongated support arms 38 disposed in transversely spaced and mutually parallel relationship. Only one of the arms 38 is shown in FIGS. 1 and 2. A fluid cylinder means 40 is operably connected between each of the support arms 38 and the support frame structure 12, and preferably between the support arms 38 and the goose-neck connector section 16, but not limited thereto. The connection between the support arms 38 and and the respective fluid cylinder means 40 is such that the extending of the reciprocal rod means 42 of the fluid cylinder 40 will pivot the transverse support frame means 36 in a clockwise direction about the pivot connection means 30 as viewed in FIGS. 1 and 2, and the retraction of the rod means 42 will move the transverse support frame 36 in a counterclockwise direction about the pivot connection 30.

A transversely extending rod or shaft 62 (FIG. 1) extends between the outer ends of the support arms 38 and may be secured thereto in any suitable or well known manner (not shown). A pulley means 46 is slidably secured on the rod or shaft 62 for movement therealong. The pulley means 46 may be journalled on the shaft 62 if desired, or the opposite ends of the shaft 62 may be supported by suitable journals (not shown) if desired whereby the pulley means 46 may rotate about its own longitudinal or central axis.

A pair of substantially identical winch assemblies 48 and 50 are mounted on the support frame 12, and preferably on the goose-neck connector section 16 in spaced relation with respect to the toggle links 30. Each winch assembly 48 and 50 includes a suitable motor means 52 and 54, respectively, for actuation thereof. Each winch assembly 48 and 50 also includes a winch line 56 and 58, respectively, which may be unwound therefrom upon rotation of the respective winch in one direction, and wound thereon upon rotation of the respective winch in an opposite direction, as is well known. The winch line 56 may extend outwardly from the winch 48, through a guide block means 60 mounted on the support frame means 12 in any suitable manner (not shown) and over a suitable pulley means 46 mounted on the outboard side of the respective support arm means 38. A suitable grappling means 64 is secured to the outer end of the winch line 56 for a purpose as will be hereinafter set forth. The winch line 58 may extend through a similar guide block (not shown) and over a pulley means 68 mounted on the outboard side of the respective support arm means 38, and a similar grappling means (not shown) is secured to the outer end thereof. Both lines 56 and 58, however, may extend from the block 60 directly to a cable spooling drum 72.

It is to be noted that suitable tongue jacks 70 may be provided for the support frame assembly 12 (only two of which are shown in FIGS. 1 and 2). The jacks may be selectively lowered and raised by suitable fluid cylinder means or hand crank means (not shown) as is well known, whereby the assembly 10 may be self-supported, independently of the towing vehicle (not shown) if desired.

Referring now to FIG. 3, the ramp or tail gate means 18 may be of any desired or suitable configuration, and as shown herein preferably includes a floor plate means 15 having a pair of spaced, mutually parallel grooves or tracks 17 and 19 extending longitudinally along the opposite sides thereof. The grooves 17 and 19 are preferably spaced apart a distance substantially corresponding to the distance between the side flanges of usual cable spooling drum 72, for a purpose as will be hereinafter set forth.

Figure 4A:
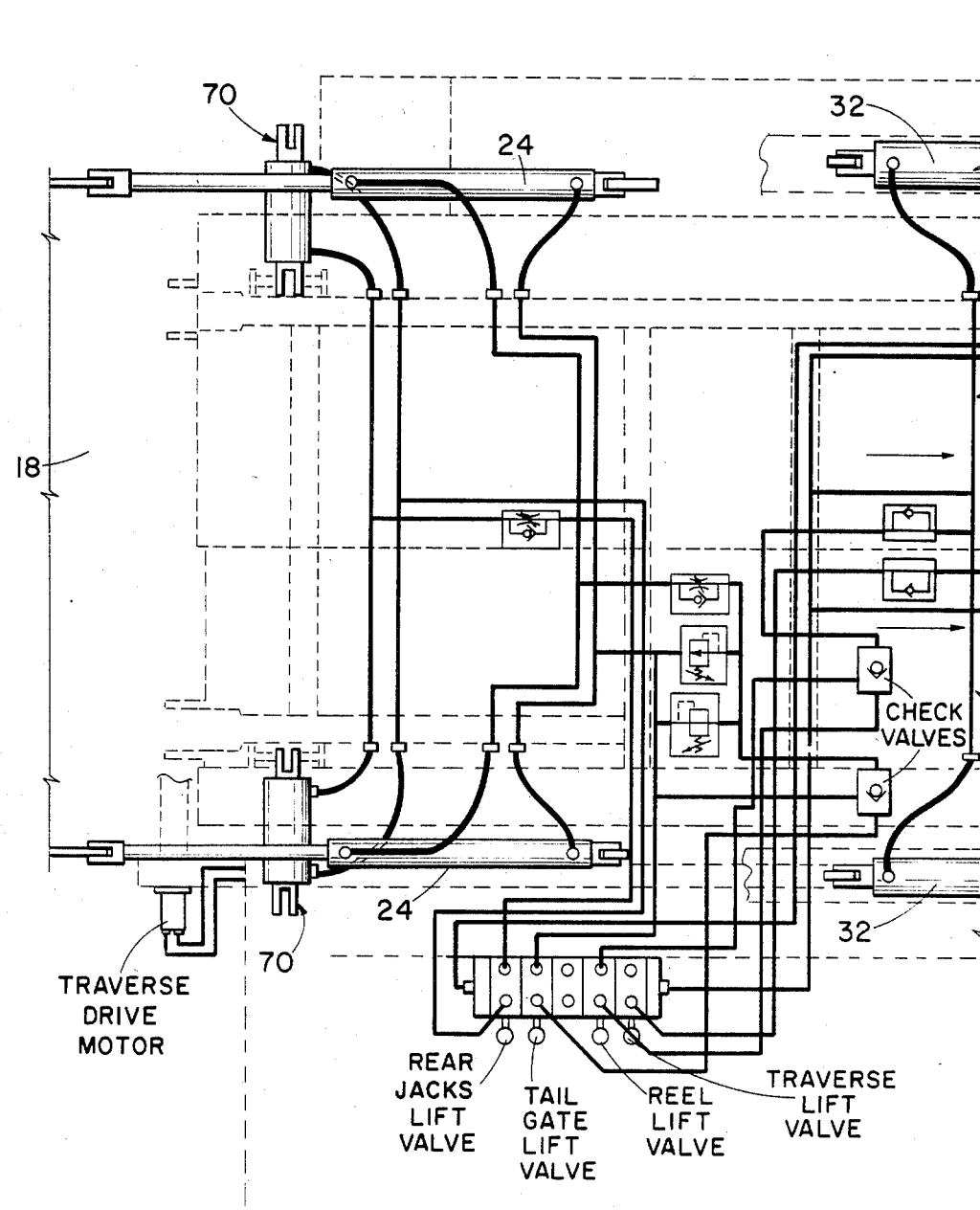
FIGS. 4A and 4B are a schematic view of a hydraulic system utilized in a cable service apparatus embodying the invention, with a plan view of the cable service apparatus illustrated in broken lines.
Figure 4B:
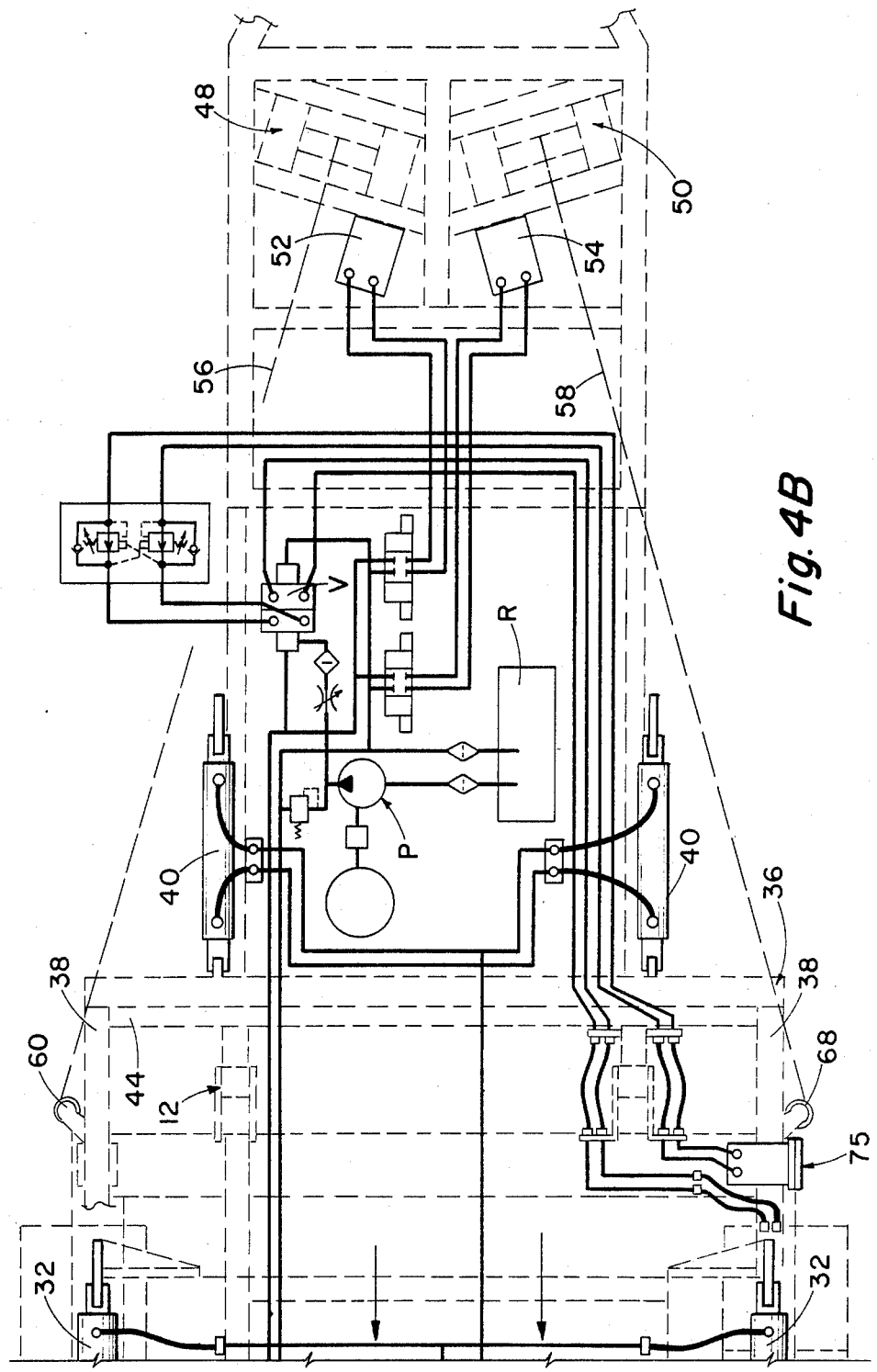

As hereinbefore set forth, the winch motors 52 and 54 are preferably fluid or hydraulic motors, but not limited thereto. In addition, the fluid cylinders 24, 32 and 40 are also preferably hydraulic cylinders and are suitably operably connected with a fluid reservoir R in any suitable or well known manner, and as shown schematically in FIGS. 4A and 4B. The reservoir R may be mounted on the frame 12 in any suitable manner and at any convenient location, as desired. Suitable reversing valve means V are provided in combination with the transverse lift apparatus 36 and are operably connected in the hydraulic system. The electrical components for the operation of the apparatus are operably connected with a suitable generator means or battery B, the electrical schematic for the elements being illustrated in FIG. 5. All of the actuating or control elements for the operation of the electrical components and hydraulic components of the apparatus 10 are mounted on a suitable console panel, or the like, which is disposed in spaced relation with respect to the location wherein the cable 73 is being spooled or wound onto the drum 72 or unspooled or unwound therefrom.

In use, the towing vehicle (not shown) may be driven or manuevered into a position whereby the tail gate means 18 is disposed in the proximity of the cable spooling drum 72 (which is normally disposed on the ground) and whereby the winch lines 56 are within reach of the drum 72. The tail gate or rear ramp 18 may then be lowered by the actuation of the hydraulic cylinders 24 whereby the outer edge of the ramp is disposed against or in the proximity of the ground, as shown in FIG. 2. A suitable reel shaft S may then be placed in the usual reel arbor holes of the drum 72, and the winch lines 56 and 58 may be secured to the opposite ends of the reel shaft by the respective connection means 64. In this manner, an independently operably winch line is connected at each end of the reel shaft. The operator of the apparatus 10 may then position himself or station himself at the remotely disposed control console or control panel, where he is physical displaced from the cable drum 72, but in visual contact therewith. The winches 48 and 50 may be activated for simultaneously winding the winch lines 56 and 58 onto the respective winches, and pulling the cable spooling drum 72 onto the ramp or tail gate means 18. The side flanges of the spooling drum 72 are aligned with the tracks or grooves 17 and 19, and the continued winding of the winch lines onto the respective winches rolls or pulls the cable spooling drum up the ramp and onto the frame portion 14.

As the cable spooling drum 72 is being pulled onto the frame section 14, the cylinders 32 are maintained in the contract position thereof for maintaining the cable lift arms 28 in a lowered position as shown in FIG. 1. When the reel shaft has been positioned in the proximity of the cable lifting means 34, the cylinders 32 may be activated for pivoting the cable lift arms 28 upwardly, bringing the means 34 into engagement with the opposite ends of the reel shaft whereby the cable spool 72 will be securely anchored in position on the apparatus 10.

The cable 73 of the drum 72 may be positioned over the outer periphery of the pulley means 46 in the usual or well known manner, and the cable spool motor means 75 (FIG. 4B) may be activated for rotation of the spool to achieve the cable winding or unwinding operation in the usual or well known manner. It may be desirable to provide a free wheeling action for the drum 72 during the unwinding of the cable therefrom, with a positive spool drive being utilized for the cable winding operation.

The automatic reversing devices provided on the traverse apparatus 36 reverses the direction of travel of the cable winding onto the drum. For example, as the winding layer of cable approaches one of the cable flanges, the reversing apparatus is engaged, and causes the cable to reverse its longitudinal direction along the drum. The traverse mechanism 36 may be raised and lowered by the actuation of the cylinders 40 to permit entry of the cable drum 72 onto the frame section 14, and may be lowered to position the pulley means 46 in the proper position for guiding of the movement of the cable onto and off of the drum 72, as is well known.

Of course, the cable loading operation may be reversed in order to remove or unload the cable spooling drum 72 from the apparatus 10. In addition, it may be desirable to secure a suitable chain means 21 between the traversing apparatus 36 and the ramp 18 in the raised position of the ramp for cooperation with the cylinders 24 in the retention of the ramp in the raised position.

From the foregoing it will be apparent that the present apparatus provides a cable spool drum lifting apparatus for facilitating the use of the cable spool drum at a field side, as for example, at a well head site of a well bore drilling or producing operation. Of course, the apparatus may be utilized in other environments, such as pulling mired vehicles from the muddy areas frequently found around a well bore site, or on lease roads leading into and away from a well bore site, or to move skid mounted equipment from position to position in the field, or at the well site. The apparatus is particularly designed for operator safety by positioning the operator in a position away from the actual cable operation while keeping him in visual contact with the entire operation to assure an efficient result.

Whereas the present invention has been described in particular relation to the drawings attached hereto, it should be understood that other and further modifications, apart from those shown or suggested herein may be made within the spirit and scope of this invention.

What is claimed is:

1. Apparatus for loading and unloading a flanged cable spooling drum and comprising; support frame means, ramp means pivotally secured to one end of the support frame means and extending substantially outwardly from the end of the support frame means and wherein the ramp means is movable between a lowered loading position and an elevated transporting position, reel lift arms pivotally secured on the support frame means with cable spooling drum engagement means operatively attached at the end of the reel lift arms away from the pivotal attachment to the frame support means and wherein the cable spooling drum engagement means is displaced inwardly and extends towards the ramp means when the ramp means is lowered such as to engage with a cable spooling drum to be rolled up the ramp means during loading and wherein the cable spooling drum engagement means is movable between lowered and raised positions, traverse lifting frame means pivotally secured on the support frame means with traverse means operatively attached at the end of the traverse lifting means away from the pivotal attachment to the support frame means for automatically guiding the movement of cable during the unwinding and winding thereof on the cable spooling drum, wherein the traverse means is movable between a raised and lowered position for facilitating loading of the cable spooling drum onto the support frame means and into engagement with the cable spooling drum engagement means, winch means mounted on the support frame means and engageable with the cable spooling drum for winching the cable spooling drum onto the support frame means, and cable winding means operatively secured to the cable spooling drum for rotation of the cable spooling drum about its longitudinal axis while supported on the support frame means.

2. Apparatus as set forth in claim 1 wherein the ramp means includes a tail gate member pivotally secured to one end of the support frame means, and fluid cylinder means operably secured between the support frame means and the tail gate member for pivoting of the tail gate members between a raised and lowered position.

3. Apparatus as set forth in claim 2 wherein the tail gate member comprises floor plate means having a pair of spaced and mutually parallel grooves extending longituidnally therealong for receiving the cable spooling flanges therein during the loading and unloading of the cable spooling drum for the support frame means.

4. Apparatus as set forth in claim 2 wherein the fluid cylinder means comprises hydraulically actuated cylinder means.

5. Apparatus for loading and unloading a flanged cable spooling drum and comprising support frame means, ramp means pivotally secured to the support frame means and movable between a lowered position and an elevated transporting position, cable spooling drum engagement means pivotally secured on the support frame means and movable between lowered and raised positions, traverse means pivotally secured on the support frame means for automatically guiding the movement of the cable during the unwinding and winding thereof on the cable spooling drum and movable between a raised and lowered position for facilitating loading of the cable spooling drum on the support frame means, winch means comprising a pair of winches mounted on the support frame means, each of said winches being independently engageable with the cable spooling drum for facilitating the loading and unloading thereof with respect to the support frame means, and cable winding means operably secured to the cable spooling drum for rotation of the cable spooling drum about its longitudinal axis while support on the support frame means.

6. Apparatus as set forth in claim 1 wherein the cable spooling drum engaging means is movable to a lowered position during the loading and unloading of the cable spooling drum with respect to the support frame means and movable to a raised position for engagement with the cable spooling drum in the loaded position thereof for facilitating retaining of the cable spooling drum in the loaded position.

7. Apparatus as set forth in claim 6 and including fluid cylinder means operably secured between the support frame means and the cable spooling drum engaging means to provide the pivotal movement therefor.

8. Apparatus as set forth in claim 1 wherein the traverse means includes pulley means disposed in spaced relation with respect to the cable spooling drum in position on the support frame, the pulley means receiving the cable from the cable spooling drum thereover during actuation of the cable spooling drum in a cable winding and unwinding operation.

9. Apparatus as set forth in claim 8 wherein the pulley means is movable in a longituidnal direction with respect to the cable spooling drum.

10. Apparatus as set forth in claim 8 and including fluid cylinder means operably secured between the support frame means and the traverse means for providing the pivotal movement therefor.

11. Apparatus as set forth in claim 1 wherein the transverse lifting frame means is pivotally attached to toggle link means and wherein the toggle link means is operatively attached to the reel lift arms.

* * * * *